US012635676B2

(12) United States Patent
Zieske

(10) Patent No.: US 12,635,676 B2
(45) Date of Patent: May 26, 2026

(54) TOTE RELEASABLY ATTACHABLE TO A RAIL

(71) Applicant: 1257425 B.C. LTD., Vancouver (CA)

(72) Inventor: Tyler H Zieske, Princeton (CA)

(73) Assignee: 1257425 B.C. LTD., Vancouver (CA)

( * ) Notice: Subject to any disclaimer, the term of this patent is extended or adjusted under 35 U.S.C. 154(b) by 0 days.

(21) Appl. No.: 18/501,562

(22) Filed: Nov. 3, 2023

(65) Prior Publication Data

US 2024/0057578 A1 Feb. 22, 2024

Related U.S. Application Data

(63) Continuation-in-part of application No. 16/481,558, filed as application No. PCT/CA2018/050122 on Feb. 2, 2018, now abandoned.

(Continued)

(51) Int. Cl.
A01K 97/06 (2006.01)
A01K 97/10 (2006.01)
(Continued)

(52) U.S. Cl.
CPC .............. A01K 97/10 (2013.01); A01K 97/06 (2013.01); B65D 25/04 (2013.01); B65D 25/108 (2013.01); B65D 25/14 (2013.01); B65D 25/24 (2013.01); B65D 25/30 (2013.01); B65D 43/163 (2013.01); B65D 2543/00194 (2013.01)

(58) Field of Classification Search
CPC ........ A01K 97/22; A01K 97/01; A01K 97/06; A01K 97/10; A01K 97/04; A01K 97/05

USPC ........ 43/4, 54.1, 21.2; 206/315.11; 224/920, 224/922; 114/255; 248/226.11, 231.31, 248/231.41, 231.71; 226/11; 231/31, 41, 231/71

See application file for complete search history.

(56) References Cited

U.S. PATENT DOCUMENTS

| | | | |
|---|---|---|---|
| 1,405,422 A | 2/1922 | Kennedy | |
| 2,430,112 A | 11/1947 | Hamre | |

(Continued)

FOREIGN PATENT DOCUMENTS

| | | |
|---|---|---|
| DE | 4210864 A1 | 10/1993 |
| EP | 2887328 A1 | 6/2015 |
| WO | 2018141066 A1 | 8/2018 |

OTHER PUBLICATIONS

International Patent Application No. PCT/CA2018/050122, International Search Report dated May 8, 2018, 3 pages.

(Continued)

*Primary Examiner* — Zoe Tam Tran

(74) *Attorney, Agent, or Firm* — MBM Intellectual Property Law LLP

(57) ABSTRACT

The present invention relates to an apparatus, releasably attachable to a rail, having a holder and a receptacle for receiving and releasably attaching to the rail to support the holder on the rail, wherein the holder includes an outboard portion and an inboard portion, wherein the outboard portion lies beyond the rail and the inboard portion lies within the rail, when the holder is supported on the rail, and wherein the outboard portion is lighter than the inboard portion, so that the apparatus is weight-biased within the rail, such that the apparatus is adapted to resist dislodgement by outboard forces and to tend to dislodge in an inboard direction.

19 Claims, 12 Drawing Sheets

Related U.S. Application Data

(60) Provisional application No. 62/453,654, filed on Feb. 2, 2017.

(51) Int. Cl.

| | | |
|---|---|---|
| *B65D 25/04* | (2006.01) |
| *B65D 25/10* | (2006.01) |
| *B65D 25/14* | (2006.01) |
| *B65D 25/24* | (2006.01) |
| *B65D 25/30* | (2006.01) |
| *B65D 43/16* | (2006.01) |

(56) References Cited

U.S. PATENT DOCUMENTS

| | | | | |
|---|---|---|---|---|
| 2,442,357 | A | | 6/1948 | Hamman |
| 2,560,054 | A | | 7/1951 | Wells |
| 3,291,427 | A | | 12/1966 | Hutchings |
| 3,377,736 | A | | 4/1968 | Woolworth |
| 3,775,895 | A | | 12/1973 | Jachim |
| 4,271,624 | A | | 6/1981 | Peluso |
| 4,353,182 | A | | 10/1982 | Junkas |
| 4,402,675 | A | * | 9/1983 | Eichinger ............... B63B 21/08 |
| | | | | 248/643 |
| 4,555,862 | A | | 12/1985 | Panasewich |
| 4,708,244 | A | | 11/1987 | Fish |
| 5,009,380 | A | | 4/1991 | Fee |
| D355,760 | S | | 2/1995 | Sanfilippo |
| 5,758,933 | A | | 6/1998 | Clendening |
| 6,035,800 | A | | 3/2000 | Clifford |
| 6,367,403 | B1 | | 4/2002 | Carter |
| 6,427,377 | B1 | | 8/2002 | Kim |
| 6,763,632 | B1 | | 7/2004 | Exby |
| 7,415,794 | B1 | | 8/2008 | Thomson |
| 8,371,548 | B1 | * | 2/2013 | Bishop ................... A45C 5/045 |
| | | | | 224/406 |
| 8,684,328 | B2 | | 4/2014 | Mynster |
| 9,150,353 | B2 | | 10/2015 | Jackson |
| 10,994,813 | B1 | | 5/2021 | Street |
| 2002/0116860 | A1 | * | 8/2002 | Ernst ...................... A01K 97/10 |
| | | | | 43/21.2 |
| 2003/0011173 | A1 | | 1/2003 | Shall |
| 2004/0016858 | A1 | | 1/2004 | Bong |
| 2004/0237378 | A1 | | 12/2004 | Fraser |
| 2006/0231723 | A1 | | 10/2006 | Fayerman |
| 2008/0289988 | A1 | | 11/2008 | Sorensen |
| 2010/0175231 | A1 | | 7/2010 | Lux |
| 2010/0243491 | A1 | | 9/2010 | Meyers |
| 2015/0201601 | A1 | | 7/2015 | Honermann |
| 2015/0342168 | A1 | | 12/2015 | Helms |
| 2019/0364867 | A1 | | 12/2019 | Zieske |

OTHER PUBLICATIONS

International Patent Application No. PCT/CA2018/050122, Written Opinion dated May 8, 2018, 4 pages.

Canadian Office Action for related Canadian Patent Application No. 3051715, dated Sep. 13, 2024, 4 pages.

Canadian Office Action for related Canadian Patent Application No. 3051715, dated Jan. 5, 2024, 3 pages.

\* cited by examiner

106a

106b

106

108

110

104

144, 146

102

100

108a

TOTE RELEASABLY ATTACHABLE TO A RAIL

CROSS REFERENCE TO RELATED APPLICATIONS

This application is a Continuation-in-Part of U.S. application Ser. No. 16/481,558, filed Jul. 29, 2019, which is a national phase filing of International Application No. PCT/CA2018/050122, filed Feb. 2, 2018, which claims priority to U.S. Provisional Application No. 62/453,654 filed Feb. 2, 2017. The foregoing applications are incorporated by reference herein in their entirety.

BACKGROUND OF THE INVENTION

1. Field of the Invention

The present invention relates to totes/storage apparatus for safely and conveniently storing, transporting, and deploying gear. More particularly, the invention relates to totes for storing gear between uses, transporting gear to and from a site for use, and deploying the gear for use at the site by releasably attaching the tote to a rail at the site. The invention has particular application for fishing, whether from a vehicle such as a boat or an ATV, or from a wharf. The invention has application in other fields, for example construction or maintenance, for example painting or window-washing, whether from lifts or scaffolds, for example.

2. Description of Related Art

Various pursuits entail the storage, transport and deployment of gear. The gear may be prone to loss, spillage, damage. The gear may be sharp or otherwise prone to injure. The environment at the location of storage, transport or deployment may be detrimental to the gear. Deployment of the gear may be improved by organized storage and organized deployment.

Fishing, whether from a vessel on the water, on ice, or from land, for example from an ATV or from a wharf, is an example of such a pursuit. In particular, small watercraft, such as dinghies, typically have minimal or no inbuilt storage or deployment platforms.

A desirable tote for such pursuits would:

safely retain gear in an organized way, for storage, transport and deployment, move easily and safely between storage, transport and deployment, and remain in position at the deployment site, resisting or mitigating dislodgement, both to protect and organize stored gear and to provide a reliable deployment platform for deployed gear.

Accordingly, what is needed is a better way to provide these advantages.

SUMMARY OF THE INVENTION

The present invention is directed to this need.

According to one aspect of the present invention, there is provided a tote/storage apparatus, releasably attachable to a rail, having a holder and a receptacle for receiving and releasably attaching to the rail to support the holder on the rail, wherein the holder includes an outboard portion and an inboard portion, wherein the outboard portion lies beyond the rail and the inboard portion lies within the rail, when the holder is supported on the rail, and wherein the outboard portion is lighter than the inboard portion, so that the apparatus is weight-biased within the rail, whereby the apparatus is adapted to resist dislodgement by outboard forces and to tend to dislodge in an inboard direction.

The apparatus may include a lockable adjustable stabilizer adapted to extend between the holder and the rail to stabilize the apparatus against the rail, for example to stabilize the apparatus against the rail in a plumb disposition.

The inboard portion may include at least one compartment. The at least one compartment may have at least one shelf. The at least one shelf may be slideable at least partially outside of the compartment, in which case the stabilizer may include the at least one shelf.

The at least one compartment may have a door, which may be at least one of weather-resistant, water-resistant, water-proof, tamper-resistant and lockable.

The outboard portion may include a work surface, which may be embossed with a ruler.

The apparatus may further include a fishing rod lock attached to the inboard portion of the holder, for example rotatably attached to the inboard portion of the holder by a splined compression pivot. The fishing rod lock may be an elongated tube having a longitudinal slot sized to allow passage of just a narrow portion of a fishing rod into the tube and a notch in the longitudinal slot sized to cradle a portion of a reel retained on the rod.

The apparatus may further include a pierceable pad attached to the holder for releasably retaining tackle.

The apparatus may further include a hub attached to the holder for releasably and rotatably retaining a spool of fishing line.

The holder may further include at least one recess for retaining a beverage container. The at least one recess may have a perimeter resembling the perimeter of a numeral "8". The holder may further include a second at least one recess, wherein the at least one recess and the second at least one recess are arranged to form a carrying-handle for the apparatus. The at least one recess and the second at least one recess may have respective perimeter grips and may be angled with respect to each other to form a carrying-handle for the apparatus. The carrying-handle may lie on a plumb line through the center of mass of the apparatus.

The receptacle may have at least an integral portion that is formed from a receptacle portion of the exterior of the holder.

The receptacle may be shaped to envelope a portion of the rail. The receptacle may have at least a lined portion that is lined with a material that is at least one of frictional and resilient to conform to the rail.

The receptacle may have at least an adjustable portion that is adjustable to abut the rail. The adjustable portion of the receptacle may include a lockable pivot. The adjustable portion of the receptacle may include opposing edges connected together by an adjustment mechanism for adjusting the separation between the opposing edges, the adjustment mechanism may include a lockable slide mechanism, and the lockable slide mechanism may include a leadscrew. The lockable slide mechanism may include parallel slots with respective thumb screws.

The receptacle may further include a clamping mechanism deployable to urge against the rail. The clamping mechanism may be deployable to urge against the rail from the outboard side.

The clamping mechanism may include a screw clamp and a plurality of complementary threaded holes deployed at different respective locations about the receptacle for respectively receiving the screw clamp to urge against the rail at the different respective locations, and the at least one of the plurality of threaded holes may include at least one of: a tee nut, an insert nut, and a rivet nut. The clamping mechanism may include a screw clamp and at least one complementary adjustment slot for receiving the screw clamp at different locations therein, to urge against the rail at the different respective locations.

The apparatus may further include feet for supporting the holder when it is not supported on a rail by the receptacle. The feet may include retractable spikes adapt to engage at least one of the ground and a slit between wharf slats. The feet may include runners adapted to slide over at least one of ice and snow.

The apparatus may further include a sled having a sled-rail that is receivable and releasably attachable within the receptacle.

Further aspects and advantages of the present invention will become apparent upon considering the following drawings, description, and claims.

DESCRIPTION OF THE INVENTION

The invention will be more fully illustrated by the following detailed description of non-limiting specific embodiments in conjunction with the accompanying drawing figures. In the figures, similar elements and/or features may have the same reference label. Further, various elements of the same type may be distinguished by following the reference label with a second label that distinguishes among the similar elements. If only the first reference label is identified in a particular passage of the detailed description, then that passage describes any one of the similar elements having the same first reference label irrespective of the second reference label.

DETAILED DESCRIPTION OF SPECIFIC EMBODIMENTS

(a) Structure of Specific Embodiments

Figure 1:
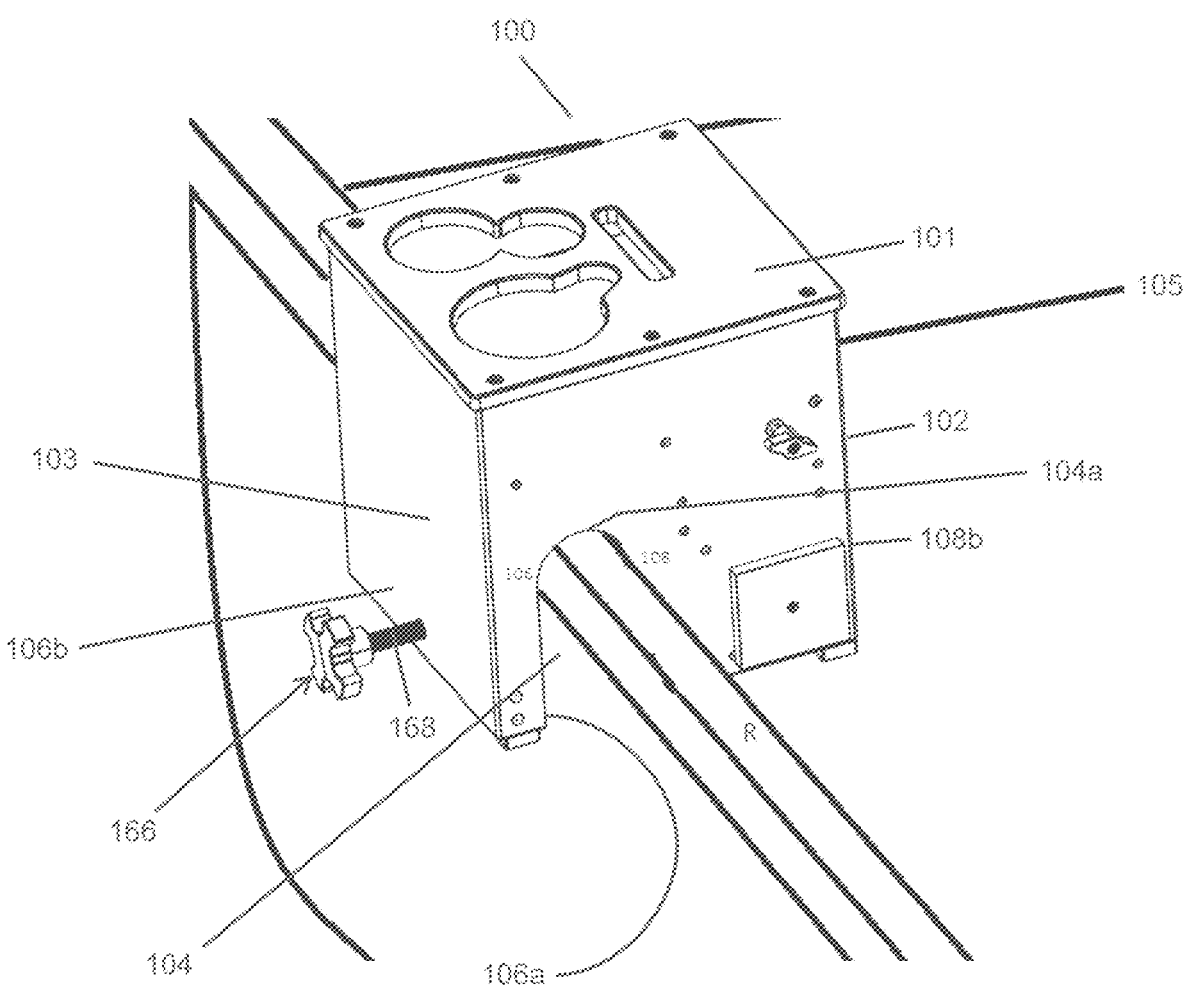
FIG. 1 is an oblique top-left-rear view of an embodiment of a tote attached to a rail, according to aspects of the present invention.

The structure of the invention will now be illustrated by explanation of specific, non-limiting, exemplary embodiments shown in the drawing figures and described in greater detail herein.

Figure 2:
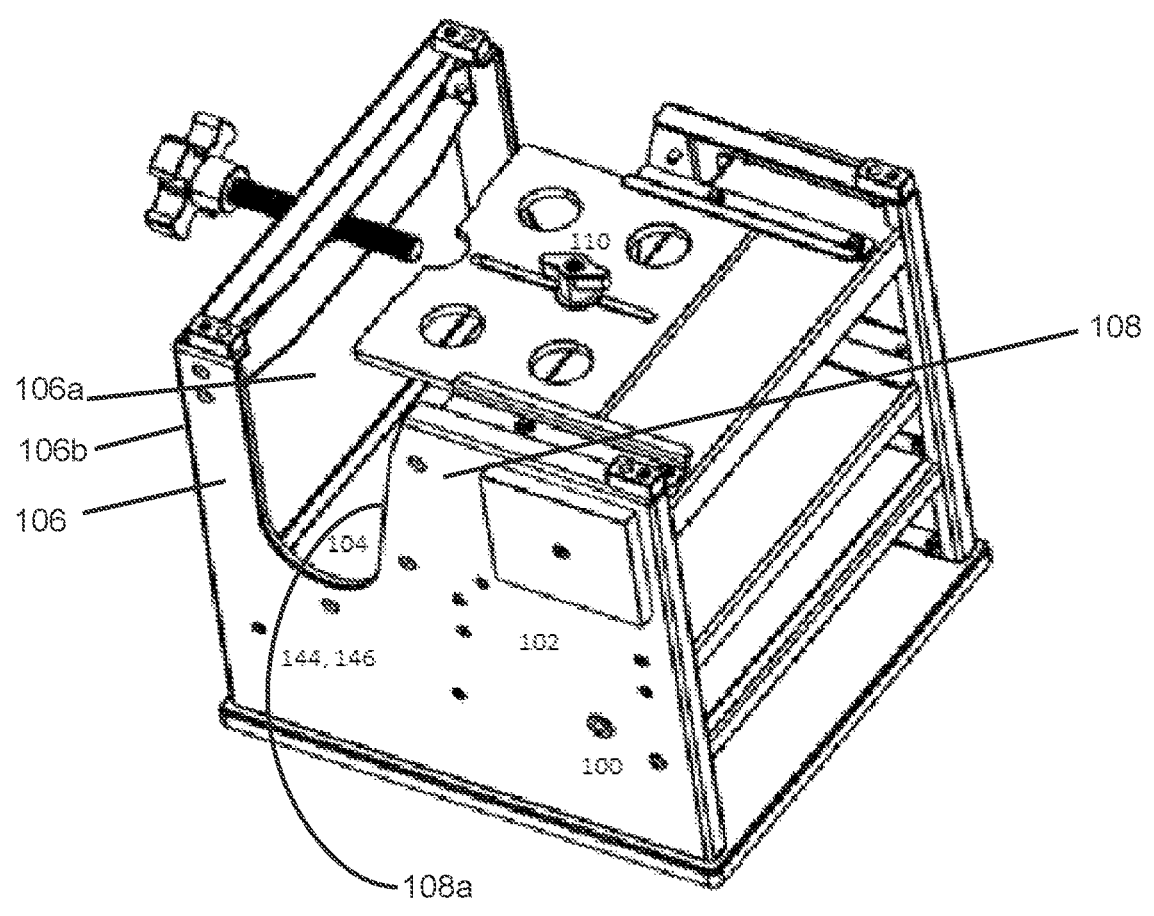
FIG. 2 is an oblique bottom-right-front view of an embodiment of a tote, according to aspects of the present invention.
Figure 3:
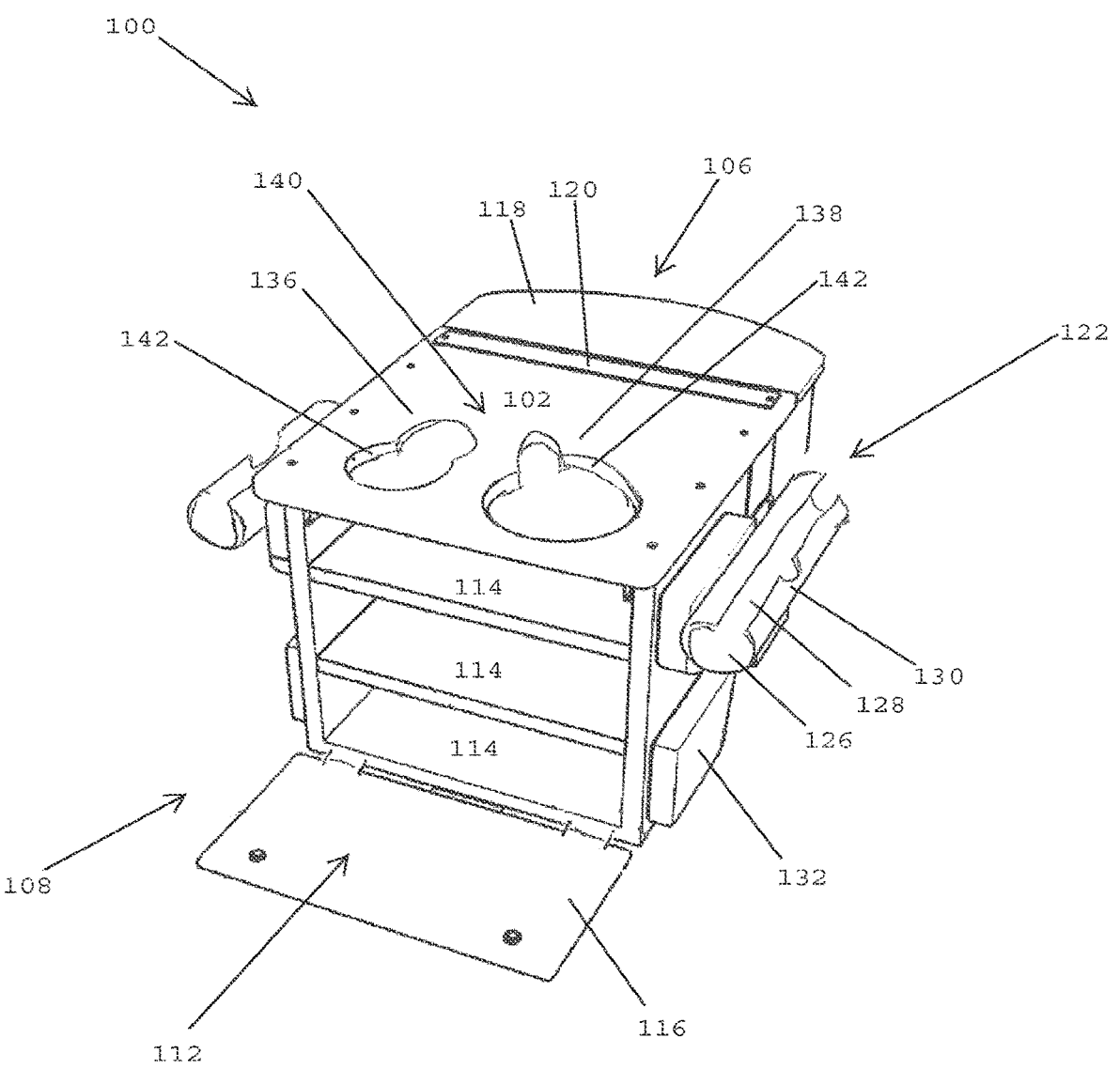
FIG. 3 is an oblique top-front-right view of an embodiment of a tote, according to aspects of the present invention.
Figure 4:
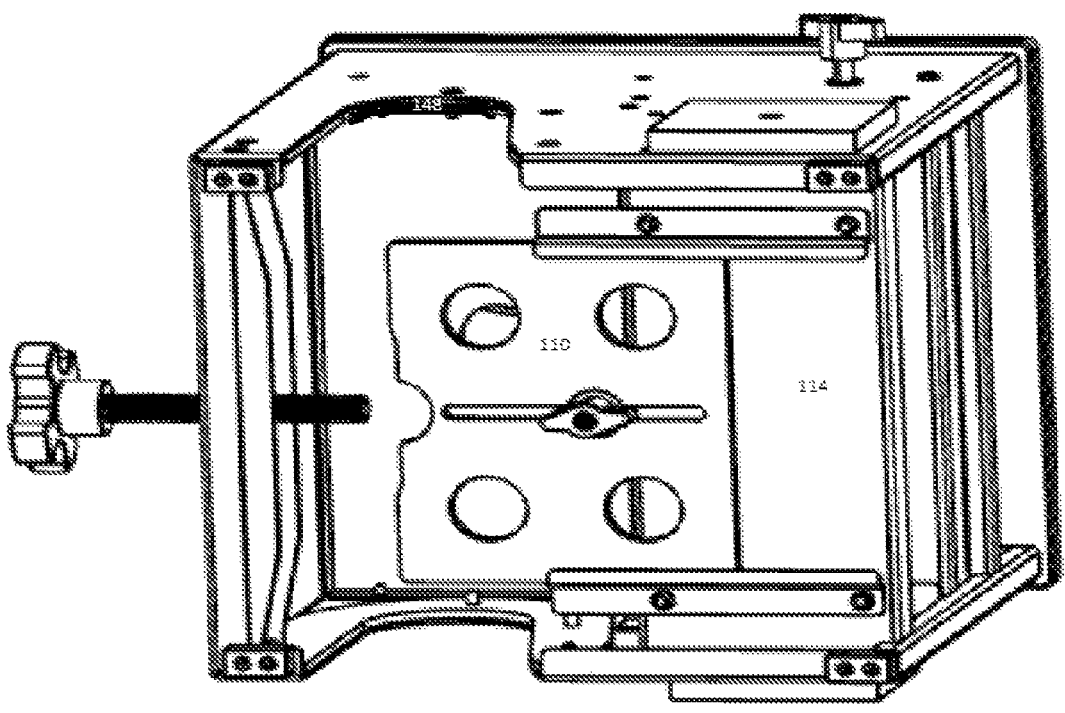
FIG. 4 is an oblique left-bottom view of an embodiment of a tote, according to aspects of the present invention.
Figure 5:
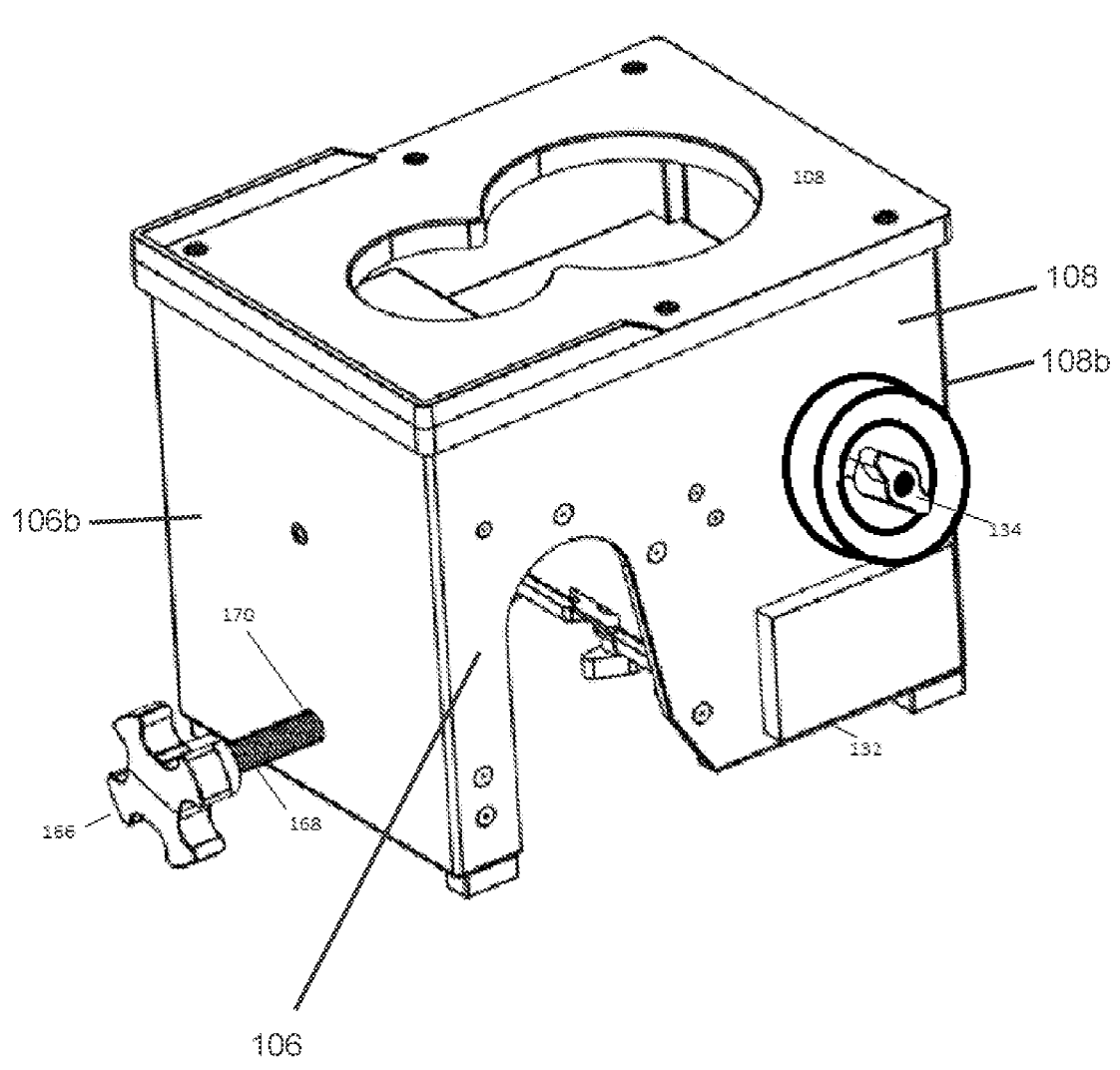
FIG. 5 is an oblique top-rear-left view of an embodiment of a tote, according to aspects of the present invention.
Figure 6:
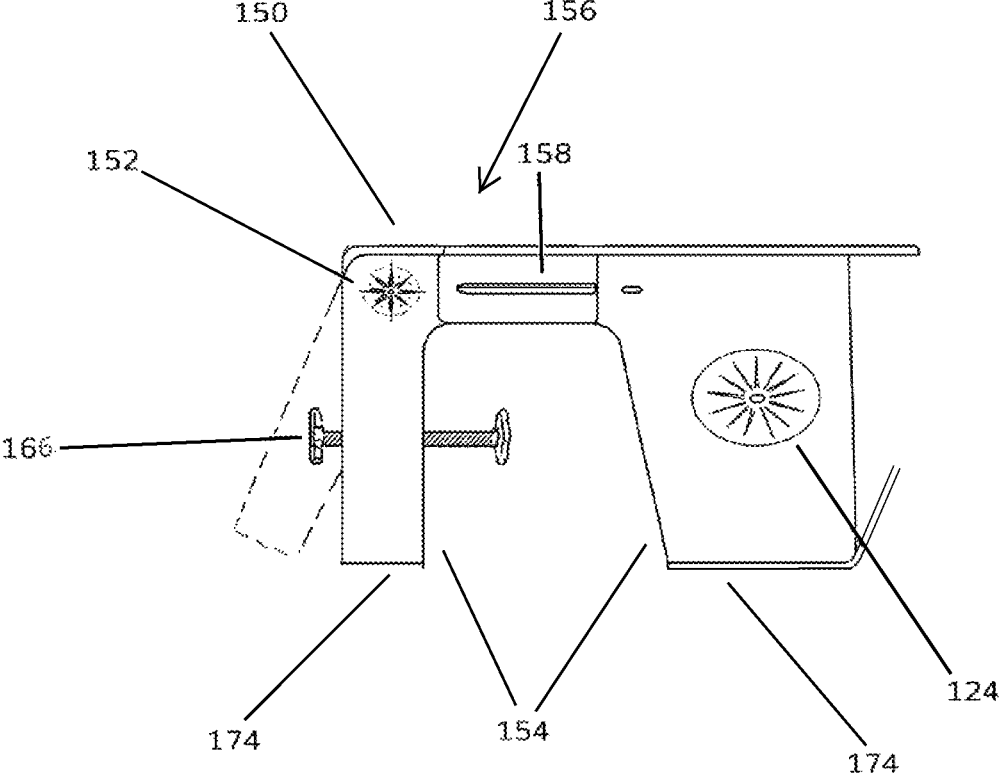
FIG. 6 is a left elevation view of an embodiment of a tote, according to aspects of the present invention.
Figure 7:
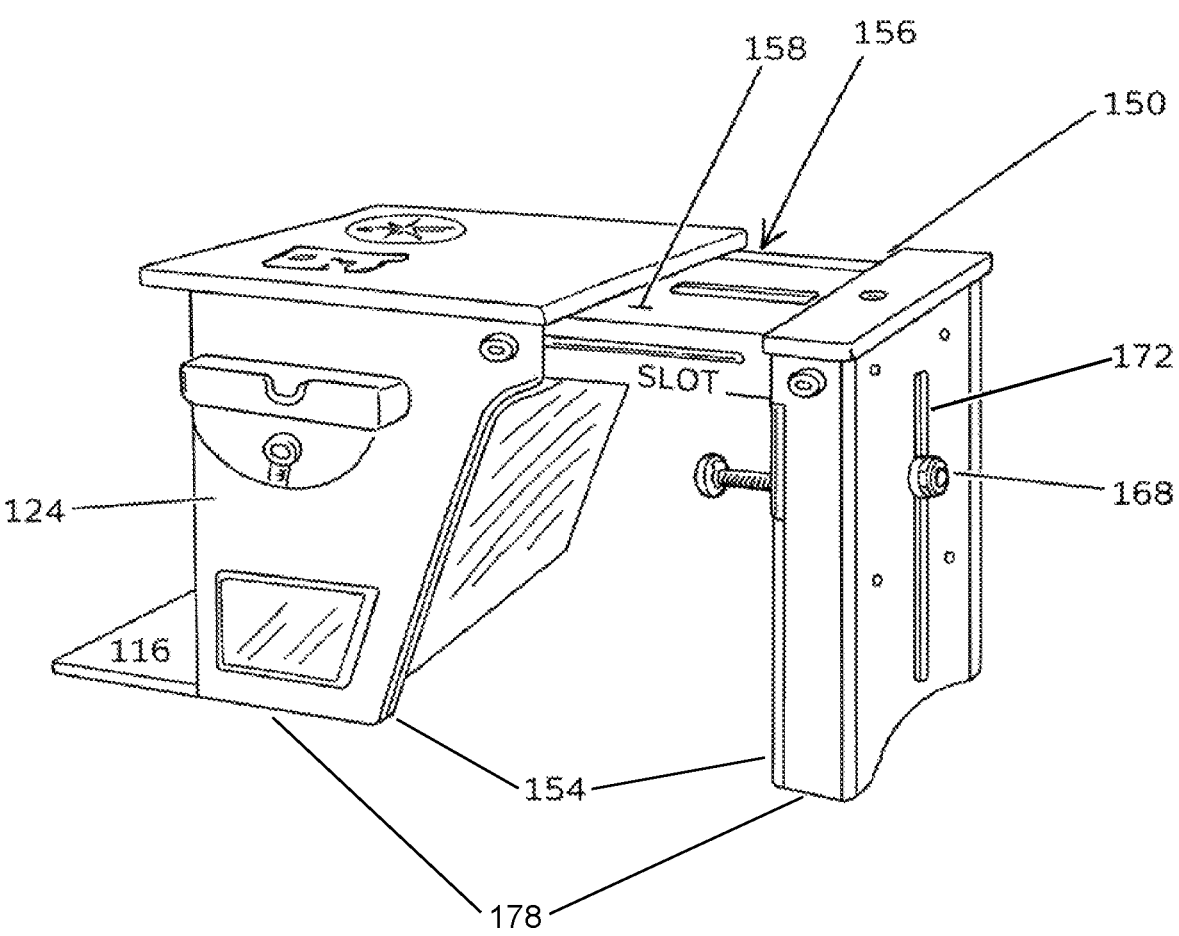
FIG. 7 is an oblique top-right-rear view of an embodiment of a tote, according to aspects of the present invention.
Figure 8:
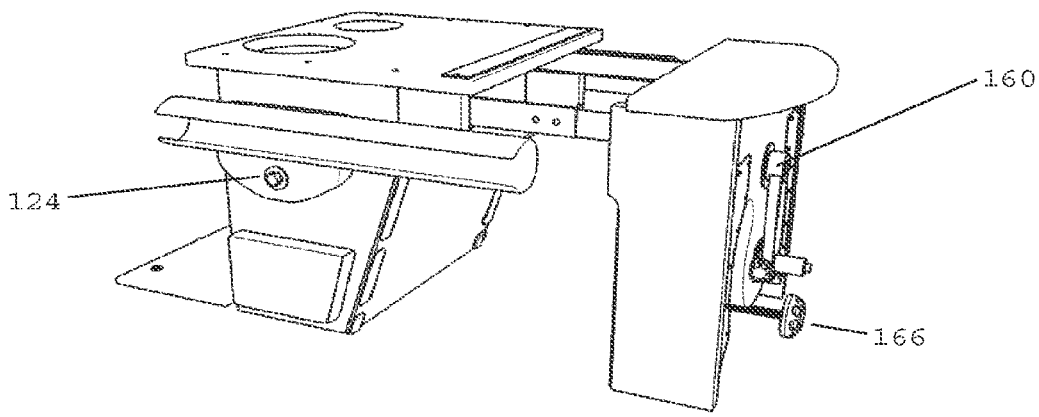
FIG. 8 is an oblique top-left-front view of an embodiment of a tote, according to aspects of the present invention.
Figure 9:
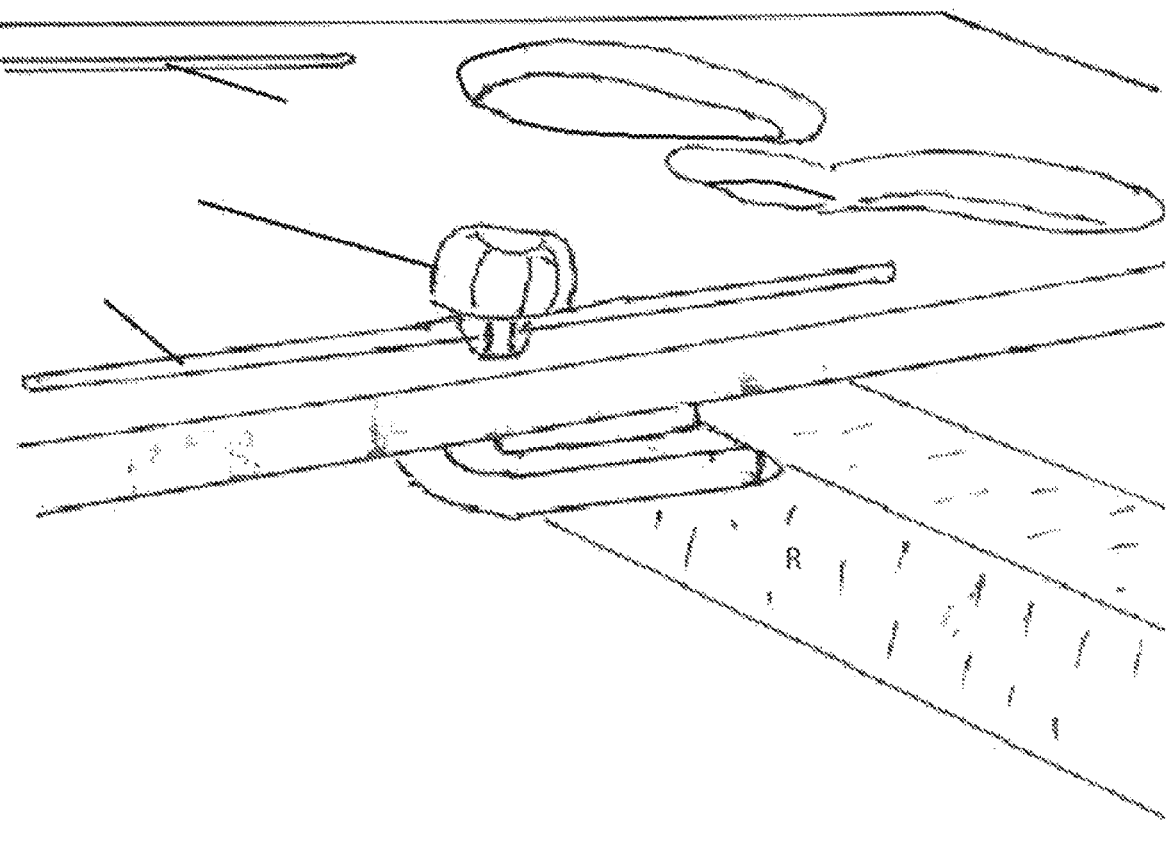
FIG. 9 is an oblique top-left-rear view of an embodiment of a tote attached to a rail, according to aspects of the present invention.
Figure 10:
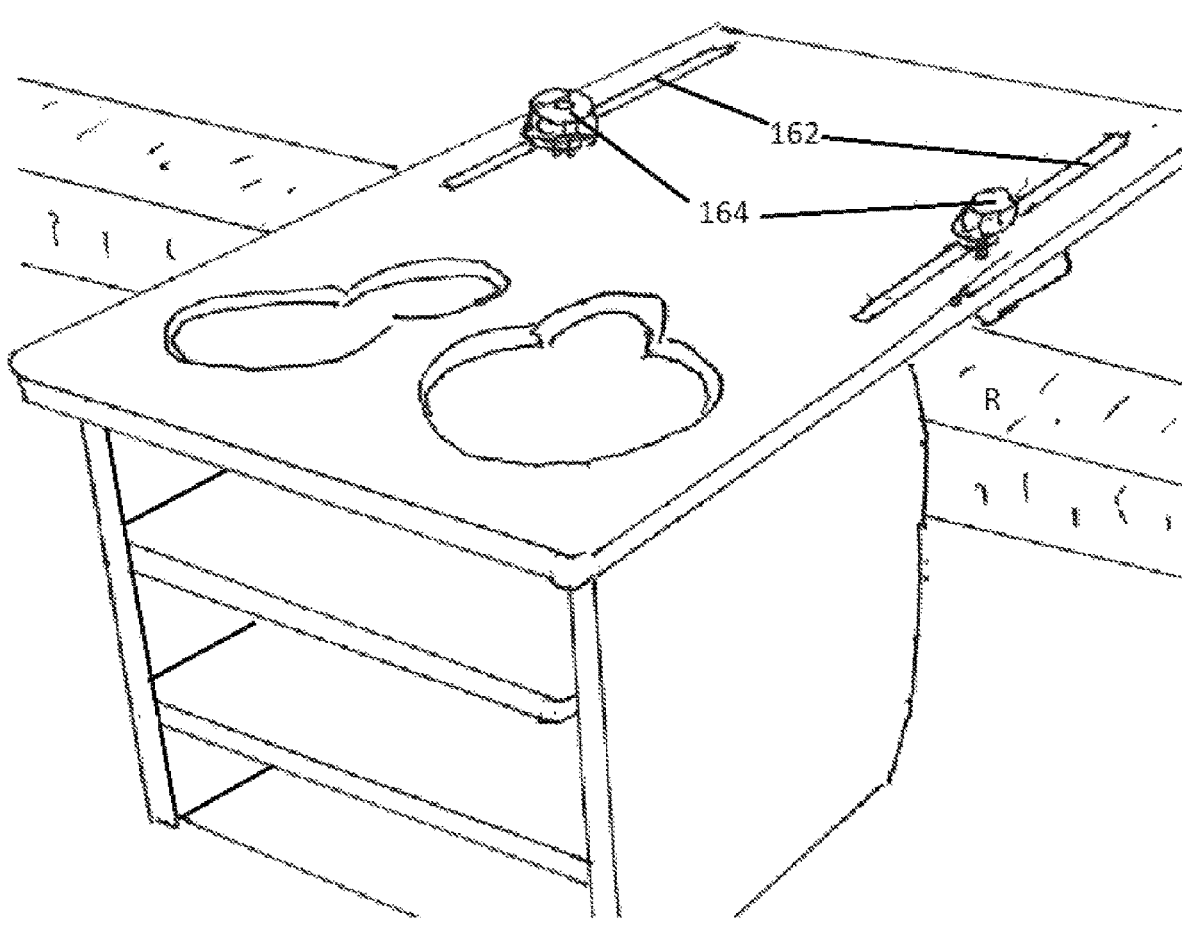
FIG. 10 is an oblique top-front-right view of the tote embodiment of FIG. 9 attached to a rail.
Figure 11:
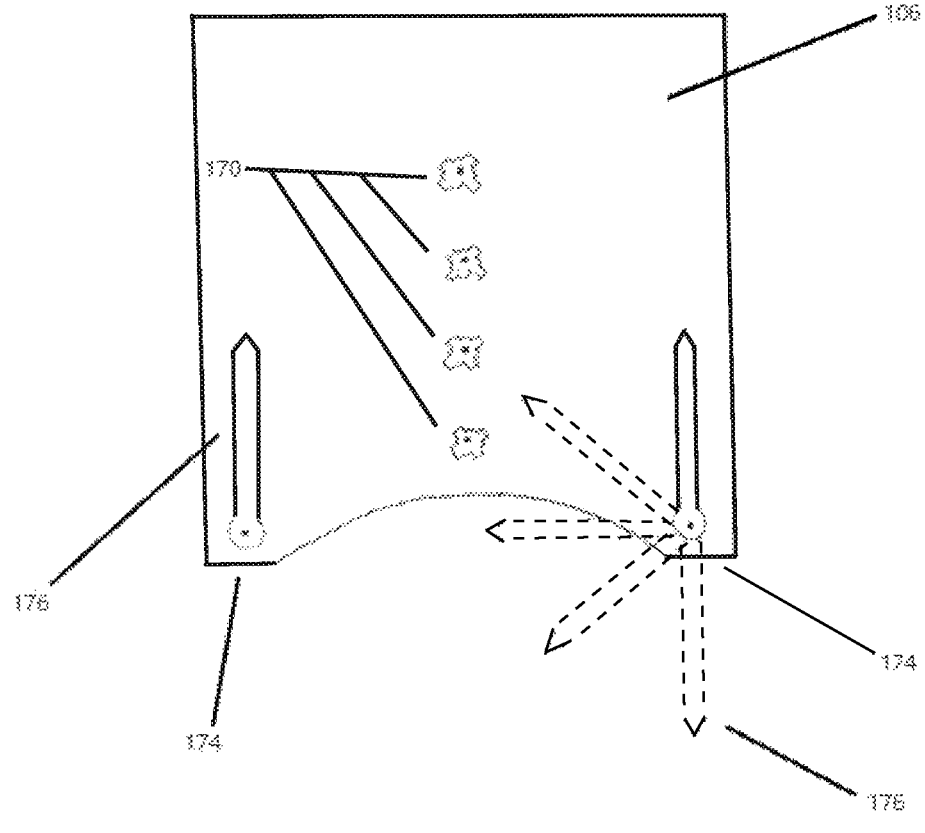
FIG. 11 is a rear elevation view of an embodiment of a tote attached to a rail, according to aspects of the present invention.
Figure 12:
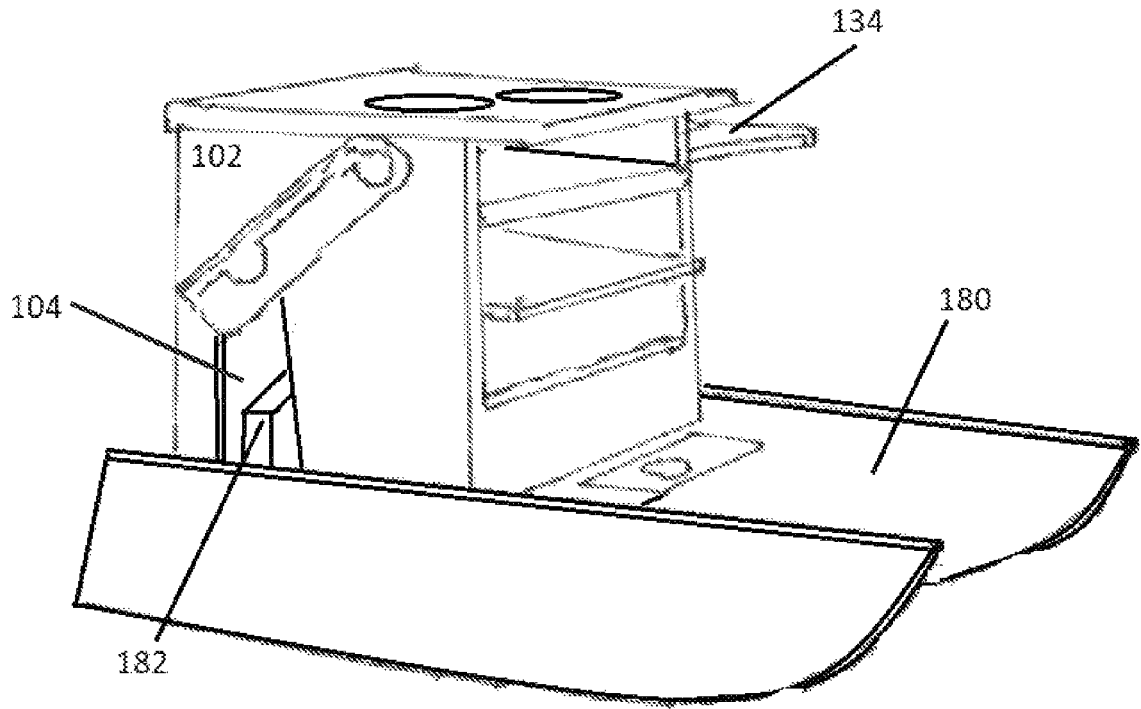
FIG. 12 is a front-left-top oblique view of an embodiment of a tote attached to a sled via a rail, according to aspects of the present invention.

FIGS. 1-12 show a tote/storage apparatus 100, releasably attachable to a rail R according to various embodiments of the present invention. The term rail is used in a broad sense, to include a pony wall, fence, railing, handrail, gunwale, fender, partition, panel, or support, for example, and more generally an object that has a broad inboard side and an opposite broad outboard side that terminate at an elongated top edge. The rail has an inboard side and an outboard side.

The tote/storage apparatus 100 has a holder body 102 for holding assorted useful items and a receptacle 104 for receiving and releasably attaching to the rail R to support the holder 102 on the rail R. The holder body 102 has an upper portion 105, an outboard portion 106 and an inboard portion 108 each extending downwardly from the upper portion to define the receptacle/channel (104), such that the outboard portion 106 lies beyond the rail R and the inboard portion 108 lies within the rail R, when the holder 102 is supported on the rail R. The outboard portion and the inboard portion each have a rail facing side (106a, 108a) and a respective opposing side (106b and 108b). The outboard portion 106 is lighter than the inboard portion 108, both in terms of its own mass and in its capacity to hold an assortment of useful items having their own mass, so that the tote 100 is weight-biased within the rail R, such that the tote 100 is adapted to resist dislodgement by outboard forces and to tend to dislodge safely in an inboard direction.

In some embodiments, the holder body can be formed of a top panel (101) and three side faces (103) each having a top end and a bottom end. Three side faces include two opposing side faces provided with an opening (104a) that extends from the bottom end towards top end. The top panel and the three side faces can together define the upper portion (105), the outboard portion (106) and the inboard portion (108) forming the receptacle/channel (104) extending between the openings (104a) of the opposing side faces, such that the channel (104) is formed between the rail facing sides of the outboard portion and the inboard portion of the holder body.

The tote 100 may include a lockable adjustable stabilizer 110 adapted to extend between the rail facing side of the inboard portion of the holder 102 and the inboard side of the rail R to stabilize the tote 100 against the rail R below the receptacle 104, for example to stabilize the tote 100 against the rail R in a plumb disposition.

The inboard portion 108 may include at least one compartment 112. The compartment 112 may have at least one shelf 114. The shelf 114 may be slideable at least partially outside of the compartment 112, in which case the shelf 114 may form at least a portion of the stabilizer 110.

The at least one compartment 112 may have a door 116, which may be at least one of weather-resistant, water-resistant, water-proof, tamper-resistant, and lockable, to provide a compartment 112 that protects gear from the environment and from theft.

The outboard portion 106 may include a work surface 118, which may be embossed with a ruler 120. The work surface 118 is beneficially level when the tote 100 is in a plumb disposition. The ruler 120 provides a way to conveniently measure the size of a catch, to determine if it may be kept or must be returned.

The tote/storage apparatus 100 may further include a fishing rod lock 122 attached to the inboard portion 108 of the holder 102 body, for example rotatably attached to the side opposite to the rail facing side of the inboard portion 108 of the holder 102 by a splined compression pivot 124, which is lockable at various angles. The fishing rod lock 122 may be an elongated tube 126 having a longitudinal slot 128 sized to allow passage of just a narrow portion of a fishing rod into the tube 126 and a notch 130 in the longitudinal slot 128 sized to cradle a portion of a reel retained on the fishing rod.

The tote 100 may further include a pierceable pad 132 attached to the holder 102 body for releasably retaining tackle such as hooks and lures.

The tote 100 may further include a hub 134 attached to the holder 102 for releasably and rotatably retaining a spool of fishing line.

The upper portion of the holder 102 body may further include at least one recess 136 for retaining a beverage container. The one recess 136 may have a perimeter resembling the perimeter of a numeral "8", in some cases one of the two circles smaller than the other. The holder 102 may further include a second recess 138, wherein the one recess 136 and the second recess 138 are arranged to form a carrying-handle 140 for the tote 100. The one recess 136 and the second recess 138 may have respective perimeter grips 142 and may be angled with respect to each other to better form the carrying-handle 140 for comfortable grip between fingers and thumb. The carrying-handle 140 may lie on a plumb line through the center of mass of the tote 100, so that the tote 100 is balanced for comfortable and convenient transport.

The receptacle 104 may have at least an integral portion 144 that is formed from a receptacle portion 146 of the exterior of the holder 102. In other words, at least a portion of the receptacle 104 may be formed as a portion of the holder 102 as opposed to being a separate object attached to the holder 102.

The receptacle 104 may be shaped to envelope a portion of the rail R. The receptacle 104 may have at least a lined portion that is lined with a material that is at least one of frictional and resilient to conform to the rail R for a more secure fit and to fit a wider variety of rails R without other adjustment.

The receptacle 104 may have at least an adjustable portion 150 that is adjustable to better abut a variety of rails R. For example, the adjustable portion 150 of the receptacle 104 may include a lockable pivot 152 to better adjust to a rail R with a slope, for example the gunwale of a dinghy having a sloped hull. The adjustable portion 150 of the receptacle 104 may include opposing edges 154 connected together by an adjustment mechanism 156 for adjusting the separation between the opposing edges 154 to better receive and attach to rails R of different widths. The adjustment mechanism 156 may include a lockable slide mechanism 158, for example having a leadscrew 160. The lockable slide mechanism 158 may include parallel slots 162 with respective thumb screws 164.

The tote 100 may further include a clamping mechanism 166 deployable to urge against the rail R to further secure attachment. The clamping mechanism 166 may be deployable to urge against the rail R from the outboard side. For example the clamping mechanism can be deployed through the outboard portion of the holder body to urge against the outboard side of the rail to urge the rail facing side of the inboard portion of the holder to contact the inboard side of the rail.

The clamping mechanism 166 may include a screw clamp 168 and a number of complementary threaded holes 170 deployed at different respective locations about the receptacle 104 for respectively receiving the screw clamp 168 to urge against the rail R at the different respective locations. At least one of the threaded holes 170 may include: a tee nut, an insert nut, or a rivet nut. The clamping mechanism 166 may include the screw clamp 168 and at least one complementary adjustment slot 172 for receiving the screw clamp 168 at different locations therein, to urge against the rail R at the different respective locations.

The tote 100 may further include feet 174 for supporting the holder 102 when it is not supported on a rail R by the receptacle 104. The feet 174 may include retractable spikes 176 adapt to engage the ground or a slit between wharf slats. The feet 174 may include runners 178 adapted to slide over ice or snow or the like.

The tote 100 may further include a sled 180 having a sled-rail 182 that is receivable and releasably attachable within the receptacle 104, to secure the tote 100 in the sled 180 for storage, transport or deployment.

(b) Operation of Specific Embodiments

With reference now to FIGS. 1-12, the operation of these specific embodiments of the invention will now be described.

Between uses, a user can use the tote 100 to store gear, using the holder 102 to store gear, for example assorted gear in the compartment 112, a fishing rod in the fishing rod lock 122, tackle on the pierceable pad 132, and a spool of fishing line on the hub 134. The tote can be stored 100 on its feet 174 on a floor in a garage, basement or closet, for example.

To transport gear to a deployment site, the user would grab the carrying-handle 140 formed by the one recess 136 and the second recess 138, grasping the perimeter grips 142 with fingers and thumb of one hand. Because the carrying-handle 140 lies on a plumb line through the center of mass of the tote 100, the comfortably and conveniently balanced for transport.

Transportation may occur in multiple stages, for example driving a truck to get close to a site and then an ATV to get closer still, and then hiking the rest of the way. In this regard, runners 178 or sled 180 of some embodiments may be useful for at least one transportation stage, for example hiking.

In the interim between transportation and deployment, the tote 100 can be set on the ground on its feet 174. For greater security, the spikes 176 can be deployed to engage the ground or a slit between slats in a wharf, to better urge the tote 100 to remain in place.

At the deployment site, the user would align the tote 100 with the rail R to receive the rail R into the receptacle 104 for releasable attachment. The receptacle 104 may receive and attach to the rail R as is, though gravity and friction, for example lined portion 148. In some embodiments, the receptacle 104 might be adjusted to better receive and attach to the rail R, for example via the adjustable portion 150. In this regard, the lockable pivot 152 might be loosened and then locked such that the receptacle 104 might be adjusted to better follow the slope of a particular rail R, for example the gunwale of a boat having a sloped hull. In another example, the separation of the opposable edges 154 of the receptacle 104 might be adjusted via the adjustment mechanism 156, to more easily receive and then tightly attach to a rail R of a particular width. In this regard, the lockable slide mechanism 158 might be adjusted with the leadscrew 160 or thumb screws 164 in parallel slots 162.

To plumb the tote 100 and improve stability, the stabilizer 110 might be suitably extended between the holder 102 and the rail R and then locked into place.

For still better attachment, the clamping mechanism 166 may be engaged to clamp the receptacle 104 to the rail R. In some embodiments, this clamping would be accomplished via a screw clamp 168, deployed either through one of the threaded holes 170 or an adjustment slot 172, where best able to clamp to the particular rail R as the case may be.

With the tote 100 so attached to the rail R, and weight-biased within the rail R, the tote 100 can resist dislodgement by outboard forces and to tend to dislodge in an inboard direction, thereby resisting or mitigating dislodgement, to protect and organize stored gear and to provide a reliable deployment platform for deployed gear.

With the tote 100 so deployed, the user can conveniently access gear safely stowed in the compartment 112, on the pierceable pad 132 or the hub 134, place a fishing rod with reel in the fishing rod lock 122 and cast his line, and then confidently place his catch on the work surface 118 to measure it using the ruler 120. To adjust the fishing rod lock, the user would reduce the compression on the splined compression pivot 124 and rotate the splined compression pivot 124 to the desired angle before increasing the compression again to engage the splines.

When finished, the user can follow the reverse process to stow gear for transport and unattach the receptacle 104 from the rail R to remove the tote 100.

Those skilled in the art will recognize that rails R may be conveniently available during transport, for example in the bed of a truck, within an SUV, or on a trailer or rack system such as a roof rack. In such cases, the receptacle 104 may be similarly attached to such rail R for transport.

(c) Description Summary

Thus, it will be seen from the foregoing embodiments and examples that there has been described an apparatus, releasably attachable to a rail R, having a holder 102 and a receptacle 104 for receiving and releasably attaching to the rail R to support the holder 102 on the rail R, wherein the holder 102 includes an outboard portion 106 and an inboard portion 108, wherein the outboard portion 106 lies beyond the rail R and the inboard portion 108 lies within the rail R, when the holder 102 is supported on the rail R, and wherein the outboard portion 106 is lighter than the inboard portion 108, so that the apparatus is weight-biased within the rail R, such that the apparatus is adapted to resist dislodgement by outboard forces and to tend to dislodge in an inboard direction.

While specific embodiments of the invention have been described and illustrated, such embodiments should be considered illustrative of the invention only and not as limiting the invention as construed in accordance with the accompanying claims. In particular, quantities described have been determined empirically and those skilled in the art might well expect a wide range of values surrounding those described to provide similarly beneficial results.

It will be understood by those skilled in the art that various changes, modifications and substitutions can be made to the foregoing embodiments without departing from the principle and scope of the invention expressed in the claims made herein.

For example, those skilled in the art will recognize that other attachments might be used with the tote 100 and that the attachments discussed (e.g. the fishing rod lock 122, pierceable pad 132, hub 134) might be placed in different locations on the tote 100 or that multiple locations on the tote 100 might be provided for the user to choose between.

While the invention has been described as having particular application for sporting and in particular fishing, those skilled in the art will recognize it has wider application, for example for construction and maintenance on lifts and scaffolds, among other applications.

What is claimed is:

1. A storage apparatus, releasably attachable to a rail having an inboard side and an outboard side, the apparatus comprising:
   a) a holder body (102) being formed of a top panel (101) and three side panels (103) each having a top end and bottom end, wherein the three side panels include two opposing side panels and a third side panel extending between respective outboard edges of the two side panels,
   the opposing side panels each having an opening (104) extending from the bottom end towards the top end, the opening being configured to receive the rail, and the third side panel being configured to be located at the outboard side of the rail;
   the top panel and the three side panels together define an upper portion (105), an outboard portion (106) and an inboard portion (108), the outboard portion and the inboard portion each having a rail facing side, and forming a channel (104) extending between the openings (104a) of the opposing side panels, to support the holder on the rail and to releasably attach the apparatus to the rail, such that the outboard portion is on the outboard side of the rail and the inboard portion is on the inboard side of the rail when the holder body is supported on the rail, and
   b) a clamping mechanism (166) deployable against the rail,
   wherein the clamping mechanism is deployable through the third panel of the holder body against the outboard side of the rail to urge the rail facing side of the inboard portion of the holder to contact the inboard side of the rail.

2. An apparatus of claim 1, wherein the outboard portion is lighter than the inboard portion, so that the apparatus is weight-biased within the rail, whereby the apparatus is adapted to resist dislodgement by outboard forces and to tend to dislodge in an inboard direction.

3. An apparatus of claim 1, further including a lockable adjustable stabilizer (110) adapted to extend between the rail facing side of the inboard portion of the holder body and the inboard side of the rail to stabilize the apparatus against the rail.

4. The apparatus as claimed in claim 3, wherein the inboard portion includes at least one compartment (112) having at least one shelf (114), wherein the at least one shelf is optionally slideable at least partially outside of the compartment.

5. The apparatus as claimed in claim 4, wherein the at least one compartment has a door.

6. The apparatus of claim 5, wherein the door is at least one of:
   a) weather-resistant,
   b) water-resistant,
   c) water-proof,
   d) tamper-resistant, and
   e) lockable.

7. The apparatus of claim 1, wherein the top panel includes a work surface (118), optionally embossed with a ruler (120).

8. The apparatus of claim 1, further including a fishing rod lock (122) attached to the side opposite to the rail facing side of the inboard portion of the holder body.

9. The apparatus of claim 8, wherein the fishing rod lock is rotatably attached to the inboard portion of the holder by a splined compression pivot.

10. The apparatus of claim 9, wherein the fishing rod lock is an elongated tube (126) having:

a longitudinal slot (128) sized to allow passage of just a narrow portion of a fishing rod into the tube, and a notch (130) in the longitudinal slot sized to cradle a portion of a reel retained on the fishing rod.

11. The apparatus of claim 1, further including a pierceable pad (132) attached to the holder for releasably retaining tackle, and/or a hub (134) attached to the holder for releasably and rotatably retaining a spool of fishing line.

12. The apparatus of claim 1, wherein the top of the holder body includes at least one recess (136) for retaining a beverage container, optionally the at least one recess has a perimeter resembling the perimeter of a numeral "8".

13. The apparatus of claim 12, wherein the holder includes a second at least one recess (138), wherein the at least one recess and the second at least one recess are arranged to form a carrying-handle (140) for the apparatus.

14. The apparatus as claimed in claim 13, wherein the at least one recess and the second at least one recess have respective perimeter grips and are angled with respect to each other to form a carrying-handle for the apparatus.

15. The apparatus of claim 1, wherein the clamping mechanism includes a screw clamp (168) and a plurality of complementary threaded holes (170) deployed at different respective locations about the third panel for respectively receiving the screw clamp to urge against the rail at the different respective locations.

16. The apparatus of claim 15, wherein at least one of the plurality of complementary threaded holes includes at least one of:

f) a tee nut, g) an insert nut, and h) a rivet nut.

17. The apparatus of claim 1, wherein the clamping mechanism includes a screw clamp and at least one complementary adjustment slot (172) for receiving the screw clamp (168) at different locations therein, to urge against the rail at the respective different locations.

18. The apparatus as claimed in claim 1, further including feet (174) for supporting the holder when it is not supported on a rail by the receptacle.

19. The apparatus of claim 1, further including a hub (134) attached to the holder for releasably and rotatably retaining a spool of fishing line.

\* \* \* \* \*